US012280359B2

(12) United States Patent
Xu et al.

(10) Patent No.: US 12,280,359 B2
(45) Date of Patent: Apr. 22, 2025

(54) INTEGRATED FILTER MATERIAL AND PREPARATION METHOD AND APPLICATION THEREOF

(71) Applicants: NANJING TECH UNIVERSITY, Jiangsu (CN); NANJING GEKOF INSTITUTE OF ENVIRONMENTAL PROTECTION TECHNOLOGY & EQUIPMENT CO., LTD., Jiangsu (CN)

(72) Inventors: Haitao Xu, Nanjing (CN); Xiaohuan Zhi, Nanjing (CN); Chaoqiang Mei, Nanjing (CN); Mingbo Li, Nanjing (CN); Jing Song, Nanjing (CN)

(73) Assignees: 1. NANJING TECH UNIVERSITY, Nanjing (CN); NANJING GEKOF INSTITUTE OF ENVIRONMENTAL PROTECTION TECHNOLOGY & EQUIPMENT CO., LTD, Nanjing (CN)

( * ) Notice: Subject to any disclaimer, the term of this patent is extended or adjusted under 35 U.S.C. 154(b) by 515 days.

(21) Appl. No.: 17/773,427

(22) PCT Filed: May 10, 2020

(86) PCT No.: PCT/CN2020/089514
§ 371 (c)(1),
(2) Date: Apr. 29, 2022

(87) PCT Pub. No.: WO2021/093286
PCT Pub. Date: May 20, 2021

(65) Prior Publication Data
US 2022/0362746 A1 Nov. 17, 2022

(30) Foreign Application Priority Data
Nov. 12, 2019 (CN) .......................... 201911098272.9

(51) Int. Cl.
*B01J 23/34* (2006.01)
*B01D 39/16* (2006.01)
(Continued)

(52) U.S. Cl.
CPC .......... *B01J 23/34* (2013.01); *B01D 39/1623* (2013.01); *B01D 46/0001* (2013.01);
(Continued)

(58) Field of Classification Search
CPC .......... B01J 23/34; B01J 31/061; B01J 31/36; B01J 37/0219; B01J 37/0228;
(Continued)

(56) References Cited

U.S. PATENT DOCUMENTS

2018/0229165 A1\* 8/2018 Castellino ................ B01J 23/30
2021/0154624 A1\* 5/2021 Oh .................... H01M 8/04149

FOREIGN PATENT DOCUMENTS

CN 101357279 A 2/2009
CN 102120116 A 7/2011
(Continued)

OTHER PUBLICATIONS

Aug. 11, 2020 International Search Report issued in International Patent Application No. PCT/CN2020/089514.

*Primary Examiner* — Daniel C. McCracken
*Assistant Examiner* — Joshua Maxwell Speer
(74) *Attorney, Agent, or Firm* — Oliff PLC

(57) ABSTRACT

An integrated filter material, a preparation method and an application. The filter material is composed of a commercial dust removal filter material and a catalyst that is grown on the filter material and that has a function of simultaneously decomposing nitrogen oxides and dioxins. In the preparation method, a precursor solution of manganese and cerium oxides is impregnated on the filter material, and manganese and cerium oxides are grown on the filter material by means (Continued)

of a chemical reaction; and vanadium oxychloride is used as a precursor of vanadium oxide and is impregnated on the filter material, reacts in water, and prepared by drying, hydrothermal and other processes. The composite filter material may remove three kinds of pollutants in flue gas at the same time, and the catalyst is firmly loaded and does not easily fall off.

8 Claims, 1 Drawing Sheet

(51) Int. Cl.
*B01D 46/00* (2022.01)
*B01D 46/02* (2006.01)
*B01D 53/86* (2006.01)
*B01J 31/06* (2006.01)
*B01J 31/36* (2006.01)
*B01J 37/02* (2006.01)

(52) U.S. Cl.
CPC ......... *B01D 46/02* (2013.01); *B01D 53/8628* (2013.01); *B01D 53/8662* (2013.01); *B01D 53/8668* (2013.01); *B01J 31/061* (2013.01); *B01J 31/36* (2013.01); *B01J 37/0219* (2013.01); *B01J 37/0228* (2013.01); *B01J 37/0236* (2013.01); *B01D 2239/0478* (2013.01); *B01D 2239/10* (2013.01); *B01D 2255/2065* (2013.01); *B01D 2255/20723* (2013.01); *B01D 2255/2073* (2013.01); *B01D 2255/915* (2013.01); *B01D 2257/404* (2013.01); *B01D 2257/70* (2013.01); *B01D 2258/0291* (2013.01); *B01D 2273/20* (2013.01)

(58) Field of Classification Search
CPC ...... B01J 37/0236; B01J 31/069; B01J 31/32; B01J 35/59; B01J 31/0247; B01J 2523/00; B01J 37/08; B01J 23/002; B01D 39/1623; B01D 46/0001; B01D 46/02; B01D 53/8628; B01D 53/8662; B01D 53/8668; B01D 2239/0478; B01D 2239/10; B01D 2255/2065; B01D 2255/20723; B01D 2255/2073; B01D 2255/915; B01D 2257/404; B01D 2257/70; B01D 2258/0291; B01D 2273/20; B01D 46/0036; B01D 2239/0464; B01D 2239/0492; B01D 2257/2064; B01D 39/14; B01D 39/08; B01D 2239/0407; B01D 2239/06
See application file for complete search history.

(56) References Cited

FOREIGN PATENT DOCUMENTS

| | | | | |
|---|---|---|---|---|
| CN | 102772953 | A | 11/2012 | |
| CN | 102145241 | B | 2/2013 | |
| CN | 108201900 | A | 6/2018 | |
| CN | 109091956 | A * | 12/2018 | ......... B01D 39/2068 |
| WO | 2009/110505 | A1 | 9/2009 | |

* cited by examiner

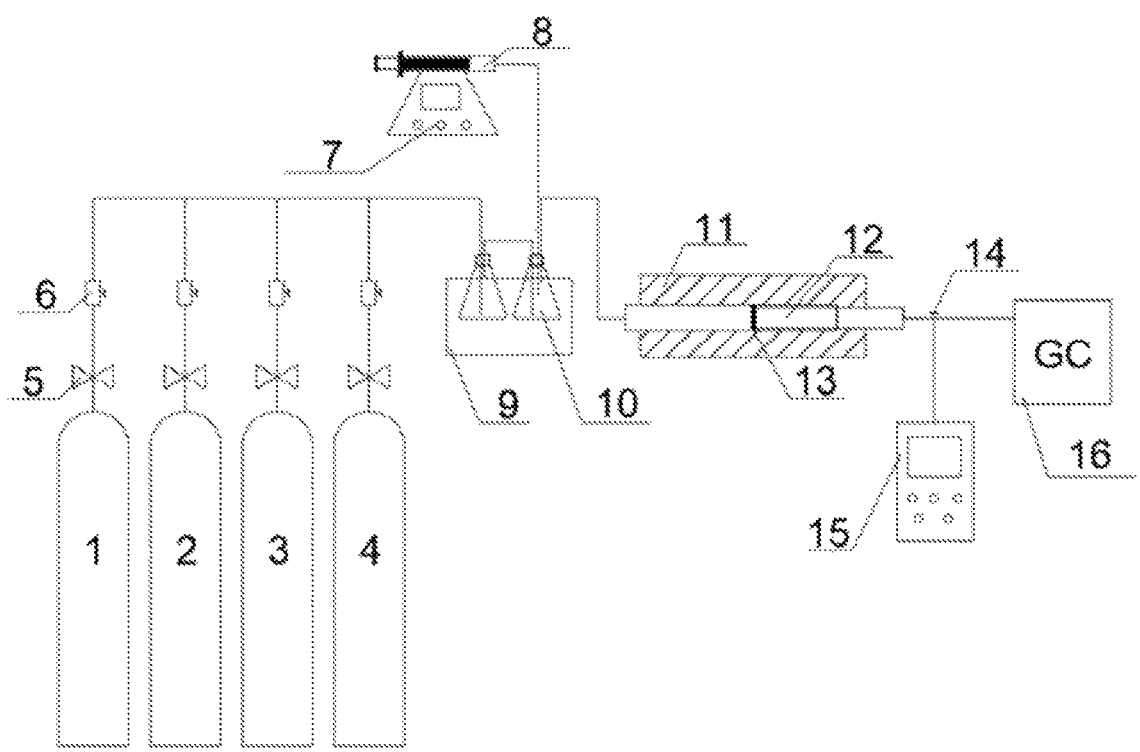

INTEGRATED FILTER MATERIAL AND PREPARATION METHOD AND APPLICATION THEREOF

TECHNICAL FIELD

The present invention relates to the field of catalysts, and specifically, to an integrated filter material and a preparation method and application thereof.

BACKGROUND

The domestic waste incineration technology is replacing conventional waste landfill technologies as the preferred method of domestic waste disposal due to thorough harmlessness, significant reduction effect, and the use of residual heat after incineration as secondary energy. Pollutants such as dust, nitrogen oxide, and dioxin are generated in the process of waste incineration, resulting in secondary contamination. Existing treatment technologies have been able to remove or degrade such pollutants, so that flue gas is discharged up to standard. However, treatment devices usually have high manufacturing and operating costs and occupy a large area, which limits the development of the waste incineration technology.

Most of existing composite filter materials focus on simultaneously removing dust and another pollutant. The invention patent entitled "DUST REMOVAL AND DIOXIN DECOMPOSITION INTEGRATION FILTER MATERIAL AND PREPARATION METHOD THEREOF" (Publication No. CN101357279A) provides a dust removal and dioxin decomposition integration filter material and a preparation method thereof. The filter material prepared by the method is processed by performing needling treatment and post-processing on a polytetrafluoroethylene microporous film containing a catalyst, a high temperature resistant fiber support layer and a base cloth layer, which has a relatively good dioxin removal effect. In the invention patent "PREPARATION METHOD OF DENITRATION-CATALYST-SUPPORTED POLYPHENYLENE SULFIDE (PPS) FILTER MATERIAL" (Publication No. CN102145241B), a catalyst precursor is impregnated on the PPS filter material acidified by nitric acid, and dust and nitrogen oxide are treated after drying and calcining, which has a good treatment effect. However, there are few invention patents about removing dust and decomposing nitrogen oxide and dioxin simultaneously.

In addition, there are mainly three methods for preparing composite filter materials. The most common method is to grind the catalyst into particles of a specific size and load onto the already formed dust removal filter material in physical manners such as impregnation and suction filtration. The process of the preparation method is simple. However, the catalyst load strength is relatively low, and the pollutant treatment effect is poor. In the second method, the catalyst particles are uniformly mixed with slurry for preparing the dust removal filter material, and the composite filter material is prepared by extruding, opening, and needling. The preparation method has high cost and technical requirements. In the third method, a catalyst precursor solution is impregnated on the dust removal filter material, to grow the required catalyst on the filter material through chemical reactions. The method has a better cooperative removal effect of nitrogen oxide. However, the load is uncontrollable, and is limited to the process that most catalysts need to be calcined at high temperature to mold. Therefore, in the method, active components of the composite filter material are limited to several specific catalysts. For the third method, to ensure that the composite filter material has the function of efficiently decomposing nitrogen oxide and dioxin simultaneously, a specific proportion of vanadium oxide needs to be added to a conventional denitration catalyst to serve as the active components. Therefore, how to generate vanadium oxide on the filter material in a calcination-free manner becomes the key to solving the problem.

SUMMARY

In view of the foregoing technical problem in the related art, the present invention provides an integrated filter material and a preparation method and application thereof.

The objective of the present invention can be achieved by the following technical solution:

A preparation method of an integrated filter material, including the following steps:

a. cutting a filter material a into a disc, immersing the disc in an aqueous solution of a surface dispersant, stirring for 1 h to 2 h, and then drying at 100° C. to 120° C. for 4 h to 6 h to obtain a surface dispersant-modified filter material b;

b. adding distilled water dropwise to the filter material b slowly until the filter material has been fully infiltrated, to determine a saturated water absorption amount of the filter material;

c. calculating a concentration of an aqueous solution of a catalyst precursor according to a required load and the saturated water absorption amount of the filter material, wherein the calculation method is as follows:

(1) calculating a number of moles of each metal component in the catalyst required for an area filter material when the load requirement is met, and calculating the mass of a required metal precursor according to the number of moles of each component; and (2) concentration of aqueous solution of each component in catalyst precursor=mass of each component of metal precursor/saturated water absorption amount of filter material; immersing the filter material b obtained in step a in the aqueous solution of the catalyst precursor and taking out the filter material b after thorough stirring for 4 h to 6 h according to the foregoing calculation; further immersing the taken-out filter material in an aqueous solution of oxalic acid and standing for 10 h to 12 h; and then drying to obtain a filter material c;

d. adding acetone dropwise to the filter material c until the filter material has been fully infiltrated, to determine a saturated acetone absorption amount of the filter material;

e. determining a concentration of an acetone solution of vanadium oxytrichloride according to the saturated acetone absorption amount of the filter material c and the required load, wherein the calculation method is as follows: concentration of acetone solution of vanadium oxytrichloride=the number of moles of required $V_2O_5$* relative molecular mass of vanadium oxytrichloride/ saturated acetone absorption amount of filter material; immersing the filter material c obtained in step c in the acetone solution of vanadium oxytrichloride and taking out after standing for 4 h to 6 h; and soaking the filter material c in an aqueous solution of sodium hydroxide with a pH value of 7.5 to 8.5, standing for 4 h to 6 h, and drying at 105° C. to 115° C. for 10 h to 12 h to obtain a filter material d; and f. placing the filter material d in a reactor, pouring absolute ethanol, reacting in a vacuum drying oven at 180° C. to 220° C. for 10 h to 14 h, taking out the filter material after the reactor is cooled, drying at 60° C. to 80° C. for 4 h to 6 h, and then finishing preparation.

An integrated filter material, where the filter material is prepared by the following methods:
  a. cutting a filter material a into a disc, immersing the disc in an aqueous solution of a surface dispersant, stirring for 1 h to 2 h, and then drying at 100° C. to 120° C. for 4 h to 6 h to obtain a surface dispersant-modified filter material b;
  b. adding distilled water dropwise to the filter material b slowly until the filter material has been fully infiltrated, to determine a saturated water absorption amount of the filter material;
  c. calculating a concentration of an aqueous solution of a catalyst precursor according to a required load and the saturated water absorption amount of the filter material, wherein the calculation method is as follows:
  (1) calculating a number of moles of each metal component in the catalyst required for an area filter material when the load requirement is met, and calculating the mass of a required metal precursor according to the number of moles of each component; and
  (2) concentration of aqueous solution of each component in catalyst precursor=mass of each component of metal precursor/saturated water absorption amount of filter material;
  immersing the filter material b obtained in step a in the aqueous solution of the catalyst precursor and taking out the filter material b after thorough stirring for 4 h to 6 h according to the foregoing calculation; further immersing the taken-out filter material in an aqueous solution of oxalic acid and standing for 10 h to 12 h; and then drying to obtain a filter material c;
  d. adding acetone dropwise to the filter material c until the filter material has been fully infiltrated, to determine a saturated acetone absorption amount of the filter material;
  e. determining a concentration of an acetone solution of vanadium oxytrichloride according to the saturated acetone absorption amount of the filter material c and the required load, wherein the calculation method is as follows: concentration of acetone solution of vanadium oxytrichloride=the number of moles of required $V_2O_5$* relative molecular mass of vanadium oxytrichloride/saturated acetone absorption amount of filter material;
  immersing the filter material c obtained in step c in the acetone solution of vanadium oxytrichloride and taking out after standing for 4 h to 6 h; and soaking the filter material c in an aqueous solution of sodium hydroxide with a pH value of 7.5 to 8.5, standing for 4 h to 6 h, and drying at 105° C. to 115° C. for 10 h to 12 h to obtain a filter material d; and
  f. placing the filter material d in a reactor, pouring absolute ethanol, reacting in a vacuum drying oven at 180° C. to 220° C. for 10 h to 14 h, taking out the filter material after the reactor is cooled, drying at 60° C. to 80° C. for 4 h to 6 h, and then finishing preparation.

In the technical solution of the present invention, the filter material in step a is made of a high temperature resistant filter material of a bag dust collector which has a continuous working temperature≥200° C., and the material of a preferred filter material includes one or more of glass fiber, Nomex™, P84™, PTFE (polytetrafluoroethylene), GLS (gallium lanthanum sulphide), and PI (polyimide).

In the technical solution of the present invention, the surface dispersant in step a is an aqueous solution of alkyl polyglucoside with a mass concentration of 0.1% to 10%, where a viscosity of alkyl polyglucoside≥1000.

In the technical solution of the present invention, the load in step c is 50 $g/m^2$ to 150 $g/m^2$, the metal precursor is manganese nitrate and cerium nitrate, and a molar ratio of manganese and cerium is (3-8):1.

In the technical solution of the present invention, drying conditions of the filter material c obtained in step c are as follows: drying at 70° C. to 90° C. for 4 h to 6 h, then drying at 180° C. to 200° C. for 10 h to 14 h, and turning the filter material over every 2 h to 4 h.

In the technical solution of the present invention, a concentration of the oxalic acid solution in step c is 1.2 times to 1.5 times a concentration of the metal salt solution.

In the technical solution of the present invention, the use amount of $V_2O_5$ in step e is 3% to 8% of the total mass of $MnO_2$ and $CeO_2$.

In the technical solution of the present invention, the filter material is used as a catalyst in dust removal and decomposition of nitrogen oxide and dioxin.

BRIEF DESCRIPTION OF THE DRAWINGS

FIG. 1 is a diagram of a device used for performance tests according to the present invention.

In the figure: 1. $N_2$ (99.999%); 2. $O_2$ (99.999%); 3. $NH_3$ (1%); 4. NO (1%); 5. pressure reducing valve; 6. mass flowmeter; 7. micro-injection syringe pump; 8. chlorobenzene; 9. oil bath; 10. mixing chamber; 11. tube furnace; 12. quartz sleeve; 13. filter material; 14. three-way valve; 15. flue gas analyzer; and 16. gas chromatograph.

The present invention has the following beneficial effects:

(1) When Mn and Ce are loaded, a composite filter material is dried by using temperature programming, and when the temperature is 105° C. to 110° C. and water is volatilized, excessive oxalic acid is solidified into fine particles and is distributed inside and on surfaces of a catalyst precursor; and when the temperature rises to 180° C. to 200° C., solid oxalic acid is volatilized, honeycomb pores are left in the filter material to increase a specific surface area of the composite filter material and provide a sufficient space for vanadium oxytrichloride to subsequently adsorb, and the catalyst will not agglomerate in a molding process and always maintains a loose state due to immersion of excessive oxalic acid, which protects an original physical structure of the filter material.

(2) A load of a composite filter material catalyst is controllable by controlling a concentration of a catalyst precursor solution; and $MnO_x$ and $CeO_2$ grown in situ and the filter material are used as adsorption carriers for vanadium oxytrichloride, the composite filter material loaded with $MnO_x$, $CeO_2$, and $V_2O_5$ is obtained in a calcination-free manner, and a preparation process is always within a working temperature range allowed by the dust removal filter material.

(3) Compared with physical methods, the composite filter material prepared by the method has lower requirements for the catalyst load, thereby greatly reducing a self-weight of the filter material.

(4) Based on hydrothermal assistance, on the one hand, unreacted precursors are removed, and on the other hand, the catalyst is firmly fixed on the filter cloth.

DETAILED DESCRIPTION

The present invention is further described below with reference to the embodiments, but the protection scope of the present invention is not limited thereto.

Embodiment 1 a. A filter material made of P84 was cut into a disc with a diameter of 30 mm, fully immersed in an aqueous solution of alkyl polyglucoside APG0814 having a concentration of 1%, stirred for 2 h, and then dried in an air dry oven at 110° C. for 6 h, to obtain an alkyl polyglucoside-modified filter material.

b. Distilled water was added dropwise to the filter material processed in step a until the filter material has been fully infiltrated, and a saturated water absorption amount of the filter material with the diameter of 30 mm was determined to be 1.7 mL.

c. To obtain a composite filter material satisfying Mn:Ce=4:1 and loaded with 50 $g/m^2$ of $MnO_2$ and $CeO_2$, 5.7248 g of manganese nitrate solution (50 wt %) and 1.7350 g of cerium nitrate hexahydrate were weighed and dissolved in water to prepare 100 mL of solution, and the filter material obtained in step a was immersed in the solution and stirred for 5 h; and 2.6 g of oxalic acid was weighed and dissolved in 100 mL of water, and the filter material was immersed in oxalic acid solution, allowed to stand for 12 h, dried in the air dry oven at 110° C. for 6 h, and then dried for 12 h after the temperature of the dry oven was adjusted to 200° C. The filter material was turned over every 2 h, and taken out after drying. The mass of the filter material was increased by 0.0335 g, and the calculated load was 47 $g/m^2$. Because a small number of catalyst particles fell into the solution in a generation process, which caused systematic errors, an actual load was less than 50 $g/m^2$.

d. Acetone was slowly added dropwise to the filter material obtained in step c until the filter material has been fully infiltrated, and a saturated acetone absorption amount of the filter material was determined to be 1.9 mL.

e. To obtain a composite filter material with a $V_2O_5$ content of 6% of the total mass of $MnO_2$ and $CeO_2$, 0.0889 g of vanadium oxytrichloride was weighed and dissolved in 100 mL of acetone. The filter material obtained in step c was immersed in vanadium oxytrichloride acetone solution for 6 h and then taken out. Sodium hydroxide was added to distilled water to adjust the pH value to 7.5. The filter material was immersed in sodium hydroxide solution, allowed to stand for 6 h, and then dried in the air dry oven at 80° C. for 12 h.

f. The filter material obtained in step e was placed in a reactor, and absolute ethanol was poured into the reactor for a reaction in a vacuum drying oven at 200° C. for 12 h. The filter material was taken out after the reactor was cooled, and then dried at 70° C. for 6 h. The mass of the filter material was increased by 0.0019 g, and the $V_2O_5$ content was 5.7%. Because a small number of catalyst particles fell into the solution in the generation process, which caused systematic errors, an actual use amount was less than 6%.

Embodiment 2 a. A filter material made of P84 was cut into a disc with a diameter of 30 mm, fully immersed in an aqueous solution of alkyl polyglucoside APG0814 having a concentration of 2%, stirred for 2 h, and then dried in an air dry oven at 115° C. for 5 h, to obtain an alkyl polyglucoside-modified filter material.

b. Distilled water was added dropwise to the filter material processed in step a until the filter material has been fully infiltrated, and a saturated water absorption amount of the filter material with the diameter of 30 mm was determined to be 1.8 mL.

c. To obtain a composite filter material satisfying Mn:Ce=4:1 and having a load of 80 $g/m^2$, 8.6513 g of manganese nitrate solution (50 wt %) and 2.6218 g of cerium nitrate hexahydrate were weighed and dissolved in water to prepare 100 mL of solution, and the filter material obtained in step a was immersed in the solution and stirred for 6 h; and 3.9 g of oxalic acid was weighed and dissolved in 100 mL of water, and the filter material was immersed in oxalic acid solution, allowed to stand for 12 h, dried in the air dry oven at 100° C. for 5 h, and then dried for 12 h after the temperature of the dry oven was adjusted to 190° C. The filter material was turned over every 2 h, and taken out after drying. The mass of the filter material was increased by 0.0529 g, and the load was 75 $g/m^2$. Because a small number of catalyst particles fell into the solution in a generation process, which caused systematic errors, an actual load was less than 80 $g/m^2$.

d. Acetone was slowly added dropwise to the filter material obtained in step c until the filter material has been fully infiltrated, and a saturated acetone absorption amount of the filter material was determined to be 1.9 mL.

e. To obtain a composite filter material with a $V_2O_5$ content of 4% of the total mass of catalysts $MnO_2$ and $CeO_2$, 0.0936 g of vanadium oxytrichloride was weighed and dissolved in 100 mL of acetone. The filter material obtained in step c was immersed in vanadium oxytrichloride acetone solution for 6 h and then taken out. Sodium hydroxide was added to distilled water to adjust the pH value to 7.5. The filter material was immersed in the sodium hydroxide solution, allowed to stand for 6 h, and then dried in the air dry oven at 80° C. for 12 h.

f. The filter material obtained in step e was placed in a reactor, and absolute ethanol was poured into the reactor for a reaction in a vacuum drying oven at 200° C. for 12 h. The filter material was taken out after the reactor was cooled, and then dried at 70° C. for 6 h. The mass of the filter material was increased by 0.020 g, and the $V_2O_5$ content was 3.8%. Because a small number of catalyst particles fell into the solution in the generation process, which caused systematic errors, an actual use amount was less than 4%.

Embodiment 3 a. A filter material made of P84 was cut into a disc with a diameter of 30 mm, fully immersed in an aqueous solution of alkyl polyglucoside APG0814 having a concentration of 3.5%, stirred for 2 h, and then dried in an air dry oven at 120° C. for 4 h, to obtain an alkyl polyglucoside-modified filter material.

b. Distilled water was added dropwise to the filter material processed in step a until the filter material has been fully infiltrated, and a saturated water absorption amount of the filter material with the diameter of 30 mm was determined to be 2.0 mL.

c. To obtain a composite filter material satisfying Mn:Ce=4:1 and having a load of 100 g/m², 9.7326 g of manganese nitrate solution (50 wt %) and 2.9500 g of cerium nitrate hexahydrate were weighed and dissolved in water to prepare 100 mL of solution, and the filter material obtained in step a was immersed in the solution and stirred for 4.5 h; and 4.4 g of oxalic acid was weighed and dissolved in 100 mL of water, and the filter material was immersed in oxalic acid solution, allowed to stand for 12 h, dried in the air dry oven at 110° C. for 6 h, and then dried for 12 h after the temperature of the dry oven was adjusted to 200° C. The filter material was turned over every 2 h, and taken out after drying. The mass of the filter material was increased by 0.0649 g, and the load was 92 g/m². Because a small number of catalyst particles fell into the solution in a generation process, which caused systematic errors, an actual load was less than 100 g/m².

d. Acetone was slowly added dropwise to the filter material obtained in step c until the filter material has been fully infiltrated, and a saturated acetone absorption amount of the filter material was determined to be 2.0 mL.

e. To obtain a composite filter material with a $V_2O_5$ content of 5% of the total mass of catalysts $MnO_2$ and $CeO_2$, 0.1364 g of vanadium oxytrichloride was weighed and dissolved in 100 mL of acetone. The filter material obtained in step c was immersed in vanadium oxytrichloride acetone solution for 6 h and then taken out. Sodium hydroxide was added to distilled water to adjust the pH value to 7.5. The filter material was immersed in the sodium hydroxide solution, allowed to stand for 6 h, and then dried in the air dry oven at 80° C. for 12 h.

f. The filter material obtained in step e was placed in a reactor, and absolute ethanol was poured into the reactor for a reaction in a vacuum drying oven at 200° C. for 12 h. The filter material was taken out after the reactor was cooled, and then dried at 70° C. for 6 h. The mass of the filter material was increased by 0.0032 g, and the $V_2O_5$ content was 4.9%. Because a small number of catalyst particles fell into the solution in the generation process, which caused systematic errors, an actual use amount was less than 5%.

Performance Tests:

Denitration and dioxin removal effects of a composite filter material were tested by using a device in FIG. 1. The composite filter material was fixed on a quartz tube with an outer diameter of 30 mm. Waste incineration flue gas was simulated by using laboratory gas distribution. The total flow rate of flue gas was 1 m/min. Gas intake components included: 0.06% of NO, 0.06% of $NH_3$, 11% of $O_2$, and the rest was $N_2$. Dioxin was simulated by using gaseous chlorobenzene. Chlorobenzene liquid was injected into a system by using a micro-injection syringe pump, and then gasified in a mixing chamber to uniformly mix with several other gases. The gaseous chlorobenzene had a concentration of 500 ppm and entered a tube furnace after uniform mixing. The composite filter material was fixed on the quartz tube with the outer diameter of 30 mm and placed in the tube furnace. The tube furnace was temperature programmed to 240° C. and kept unchanged. Exhaust was detected after the temperature became stable. The concentration of $NO_x$ was tested by using a KM9106 flue gas analyzer. The concentration of chlorobenzene was tested by using GC126N (INESA Scientific Instrument Co., Ltd). Pipes through which the gaseous chlorobenzene passed were heated and insulated by using a heating cable to prevent chlorobenzene from liquefying again.

A formula for calculating the nitrogen oxide removal rate is as follows:

$$\text{denitration efficiency} = \frac{\text{inlet } NO_x \text{ concentration} - \text{outlet } NO_x \text{ concentration}}{\text{inlet } NO_x \text{ concentration}} \times 100\%$$

A formula for calculating the chlorobenzene removal rate is as follows:

$$\text{chlorobenzene removal efficiency} = \frac{\text{inlet } MCB \text{ concentration} - \text{outlet } MCB \text{ concentration}}{\text{inlet } MCB \text{ concentration}} \times 100\%$$

A catalyst load strength testing device includes a gas source, a flow controller, and a homemade stainless steel casing. $N_2$ was injected into the stainless steel casing by using the gas source and the gas flow controller to purge the composite filter material for a long time. The catalyst removal rate of the filter material represented the bonding strength. The composite filter material for testing the catalyst load strength was fixed in the stainless steel casing with the outer diameter of 30 mm, the waste incineration flue gas was simulated by using nitrogen, and the flow speed was set to 2 m/min to purge the filter material.

A formula for calculating the catalyst load strength is as follows:

$$\text{catalyst removal rate} = \frac{\text{mass of composite filter material before purging} - \text{mass of composite filter material after purging}}{\text{mass of composite filter material before purging} - \text{mass of filter material before loading}}$$

Test Results

TABLE 1

| Sample | Catalyst load (g/m²) | Reaction time (h) | PCDD/Fs removal rate (%) | $NO_x$ removal rate (%) |
|---|---|---|---|---|
| Embodiment 1 | 47 | 4 | 96 | 93 |
|  |  | 24 | 96 | 93 |
| Embodiment 2 | 75 | 4 | 98 | 97 |
|  |  | 24 | 97 | 96 |
| Embodiment 3 | 92 | 4 | 99 | 100 |
|  |  | 24 | 99 | 100 |

TABLE 2

| Sample | Reaction time (h) | Catalyst removal rate (%) |
|---|---|---|
| Embodiment 1 | 24 | 0 |
|  | 48 | 0 |
| Embodiment 2 | 24 | 1 |
|  | 48 | 1 |
| Embodiment 3 | 24 | 0 |
|  | 48 | 0 |

Comparison of test results of comparative examples:

Solutions described in Embodiments 1 to 3 in the invention patent entitled "COMPOSITE FILTER MATERIAL FOR COOPERATIVELY REMOVING NITROGEN OXIDE AND DIOXIN, AND PREPARATION METHOD THEREOF" with Application No. 201910669473.3 are used as comparative examples for comparison, and details are as follows:

TABLE 3

| Sample | Catalyst load (g/m$^2$) | Reaction time (h) | PCDD/Fs removal rate(%) | NO$_x$ removal rate (%) |
|---|---|---|---|---|
| Embodiment 1 of comparative example | 254 | 4 | 92 | 89 |
|  |  | 24 | 91 | 89 |
| Embodiment 2 of comparative example | 318 | 4 | 96 | 93 |
|  |  | 24 | 96 | 93 |
| Embodiment 3 of comparative example | 393 | 4 | 98 | 96 |
|  |  | 24 | 98 | 95 |

TABLE 4

| Sample | Reaction time (h) | Catalyst removal rate (%) |
|---|---|---|
| Embodiment 1 of comparative example | 24 | 1% |
|  | 48 | 2% |
| Embodiment 2 of comparative example | 24 | 0% |
|  | 48 | 1% |
| Embodiment 3 of comparative example | 24 | 1% |
|  | 48 | 3% |

Through three comparative examples, it can be seen that to achieve a pollutant removal effect close to that of the present invention, the catalyst load required for the conventional invention patent is much greater than the catalyst load required for the present invention.

What is claimed is:

1. A preparation method of an integrated filter material, comprising the following steps:
   a. cutting a filter material a into a disc, immersing the disc in an aqueous solution of a surface dispersant, stirring for 1 h to 2 h, and then drying at 100° C. to 120° C. for 4 h to 6 h to obtain a surface dispersant-modified filter material b;
   b. adding distilled water dropwise to the filter material b slowly until the filter material has been fully infiltrated, to determine a saturated water absorption amount of the filter material;
   c. calculating a concentration of an aqueous solution of a catalyst precursor according to a required load and the saturated water absorption amount of the filter material, wherein the calculation method is as follows:
   (1) calculating a number of moles of each metal component in the catalyst required for an area filter material when the load requirement is met, and calculating the mass of a required metal precursor according to the number of moles of each component; and
   (2) concentration of aqueous solution of each component in catalyst precursor=mass of each component of metal precursor/saturated water absorption amount of filter material;
   immersing the filter material b obtained in step a in the aqueous solution of the catalyst precursor and taking out the filter material b after thorough stirring for 4 h to 6 h according to the foregoing calculation; further immersing the taken-out filter material in an aqueous solution of oxalic acid and standing for 10 h to 12 h; and then drying to obtain a filter material c;
   d. adding acetone dropwise to the filter material c until the filter material has been fully infiltrated, to determine a saturated acetone absorption amount of the filter material;
   e. determining a concentration of an acetone solution of vanadium oxytrichloride according to the saturated acetone absorption amount of the filter material c and the required load, wherein the calculation method is as follows: concentration of acetone solution of vanadium oxytrichloride=the number of moles of required $V_2O_5$* relative molecular mass of vanadium oxytrichloride/ saturated acetone absorption amount of filter material;
   immersing the filter material c obtained in step c in the acetone solution of vanadium oxytrichloride and taking out after standing for 4 to 6 h; and soaking the filter material c in an aqueous solution of sodium hydroxide with a pH value of 7.5 to 8.5, standing for 4 h to 6 h, and drying at 105° C. to 115° C. for 10 h to 12 h to obtain a filter material d; and
   f. placing the filter material d in a reactor, pouring absolute ethanol, reacting in a vacuum drying oven at 180° C. to 220° C. for 10 h to 14 h, taking out the filter material after the reactor is cooled, drying at 60° C. to 80° C. for 4 h to 6 h, and then finishing preparation.

2. The preparation method of an integrated filter material according to claim 1, wherein the filter material in step a is made of a high temperature resistant filter material of a bag dust collector which has a continuous working temperature≥200° C.

3. The preparation method of an integrated filter material according to claim 1, wherein the surface dispersant in step a is an aqueous solution of alkyl polyglucoside with a mass concentration of 0.1% to 10%.

4. The preparation method of an integrated filter material according to claim 1, wherein the load in step c is 50 g/m$^2$ to 150 g/m$^2$, the metal precursor is manganese nitrate and cerium nitrate, and a molar ratio of manganese and cerium is (3-8):1.

5. The preparation method of an integrated filter material according to claim 1, wherein drying conditions of the filter material c obtained in step c are as follows:
drying at 70° C. to 110° C. for 4 h to 6 h, then drying at 180° C. to 200° C. for 10 h to 14 h, and turning the filter material over every 2 h to 4 h.

6. The preparation method of an integrated filter material according to claim 1, wherein the concentration of the oxalic acid solution in step c is 1.2 times to 1.5 times a concentration of the metal salt solution.

7. The preparation method of an integrated filter material according to claim 1, wherein the use amount of $V_2O_5$ in step e is 3% to 8% of the total mass of $MnO_2$ and $CeO_2$.

8. An integrated filter material, wherein the filter material is prepared by the following methods:
   a. cutting a filter material a into a disc, immersing the disc in an aqueous solution of a surface dispersant, stirring for 1 h to 2 h, and then drying at 100° C. to 120° C. for 4 h to 6 h to obtain a surface dispersant-modified filter material b;
   b. adding distilled water dropwise to the filter material b slowly until the filter material has been fully infiltrated, to determine a saturated water absorption amount of the filter material;
   c. calculating a concentration of an aqueous solution of a catalyst precursor according to a required load and the saturated water absorption amount of the filter material, wherein the calculation method is as follows:

(1) calculating a number of moles of each metal component in the catalyst required for an area filter material when the load requirement is met, and calculating the mass of a required metal precursor according to the number of moles of each component; and (2) concentration of aqueous solution of each component in catalyst precursor=mass of each component of metal precursor/saturated water absorption amount of filter material;

immersing the filter material b obtained in step a in the aqueous solution of the catalyst precursor and taking out the filter material b after thorough stirring for 4 h to 6 h according to the foregoing calculation; further immersing the taken-out filter material in an aqueous solution of oxalic acid and standing for 10 h to 12 h; and then drying to obtain a filter material c;

d. adding acetone dropwise to the filter material c until the filter material has been fully infiltrated, to determine a saturated acetone absorption amount of the filter material;

e. determining a concentration of an acetone solution of vanadium oxytrichloride according to the saturated acetone absorption amount of the filter material c and the required load, wherein the calculation method is as follows: concentration of acetone solution of vanadium oxytrichloride=the number of moles of required $V_2O_5$* relative molecular mass of vanadium oxytrichloride/ saturated acetone absorption amount of filter material;

immersing the filter material c obtained in step c in the acetone solution of vanadium oxytrichloride and taking out after standing for 4 to 6 h; and soaking the filter material c in an aqueous solution of sodium hydroxide with a pH value of 7.5 to 8.5, standing for 4 h to 6 h, and drying at 105° C. to 115° C. for 10 h to 12 h to obtain a filter material d; and f. placing the filter material d in a reactor, pouring absolute ethanol, reacting in a vacuum drying oven at 180° C. to 220° C. for 10 h to 14 h, taking out the filter material after the reactor is cooled, drying at 60° C. to 80° C. for 4 h to 6 h, and then finishing preparation, wherein the load in step c is 50 g/m$^2$ to 150 g/m$^2$, the metal precursor is manganese nitrate and cerium nitrate, and a molar ratio of manganese and cerium is (3-8):1.

* * * * *